UNITED STATES PATENT OFFICE.

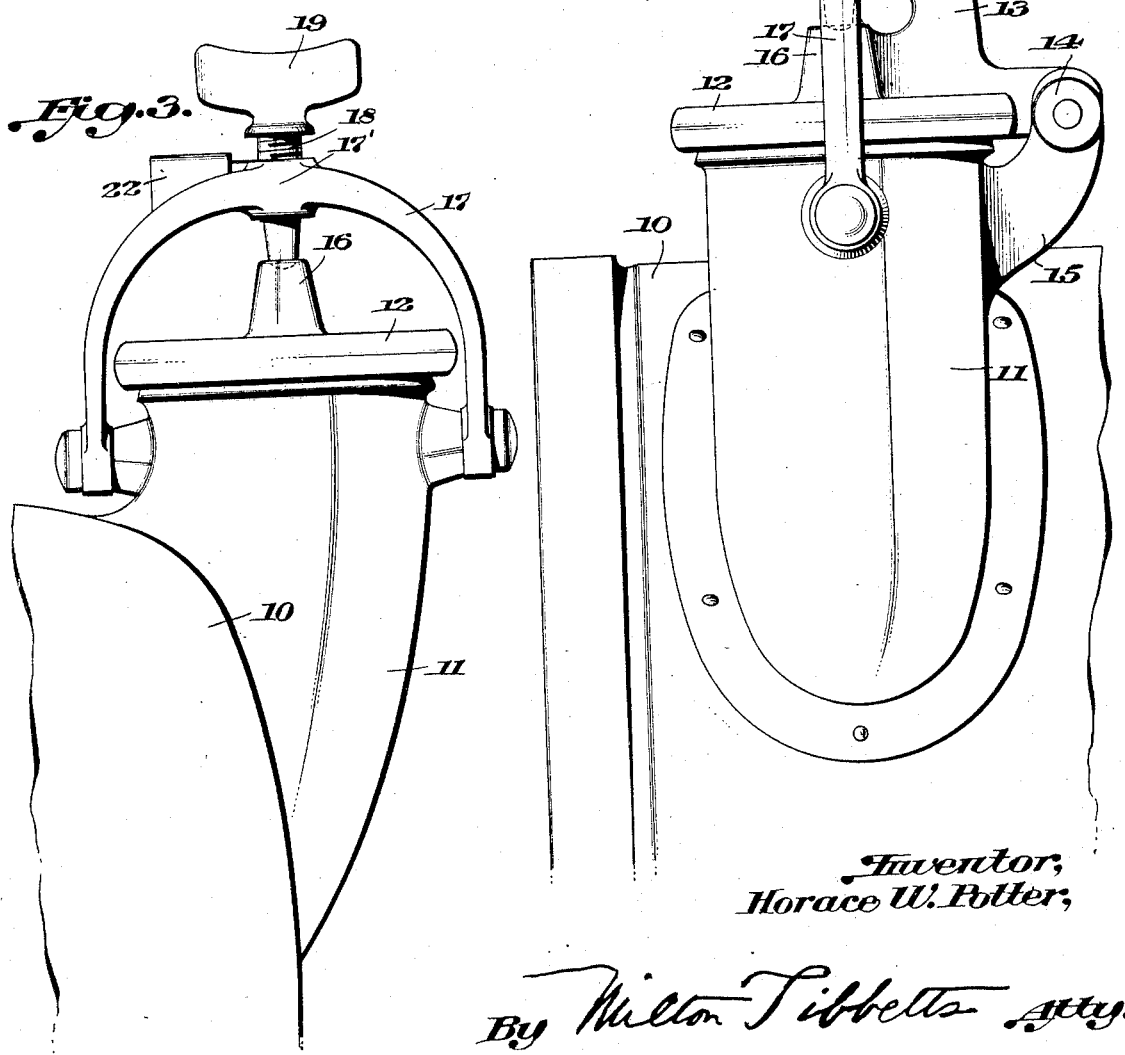

HORACE W. POTTER, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,358,462.   Specification of Letters Patent.   Patented Nov. 9, 1920.

Application filed May 19, 1919. Serial No. 298,127.

*To all whom it may concern:*

Be it known that I, HORACE W. POTTER, a citizen of the United States, and resident of Detroit, Wayne county, State of Michigan, have invented certain new and useful Improvements in Motor-Vehicles, of which the following is a specification.

This invention relates to motor vehicles, and particularly to filler caps for tanks, and especially to covers for tanks adapted to contain gasolene.

The principal object of the invention is to provide means of a simple and effective character for locking the cap in closed position so as to prevent the unauthorized withdrawal of the contents of the tank.

Another object of the invention is to utilize the cap retaining means as part of the connection between the cap and body in locking the cap against removal.

With these objects, and others in view, the invention is embodied in preferable form in the construction and arrangement hereinafter described and illustrated in the accompanying drawings, in which—

Figure 1 is a top plan view of part of a tank with the cap and the locking means applied thereto, Fig. 2 is a side view in elevation, and Fig. 3 is a front view in elevation.

Referring to the drawings, 10 indicates a tank and 11 a filling neck rising vertically therefrom. A cap 12 is adapted to cover the upper open end of this neck and it is provided on its upper surface with an upright arm or lug 13, one end of which is hinged at 14 to a bracket 15 arising from the wall of the neck. The lower part of the arm 13 merges into a central vertical boss 16 rising from the cap. Pivoted on the neck is a bail 17 adapted to swing up over the cap and above the boss and provided with a central threaded socket head 17'. A clamping screw 18 is threaded through the head 17' and is adapted to bear at its lower end against the upper surface of the boss 16, whereby the cap is retained firmly in place on the neck. This screw is provided at its upper end with a wing 19, whereby it may be turned. Projecting from the head 17' are formed arms 20 adapted to embrace and form a stop for the upper end of the arm 13. The arms 20 and the arm 13 are provided with corresponding apertures, through which is adapted to be passed the hasp 21 of a padlock 22, which may be of any suitable type and provided with any suitable key and which is adapted to constitute a lock means for preventing the unauthorized opening of the filler neck.

Having thus described my invention, what I claim and desire to secure by Letters Patent is:

1. In combination with a liquid containing tank having an opening, a filler cap therefor, a clamping screw adapted to bear against said filler cap for holding the latter closed, a movable member carrying said clamping screw and adjustable to position the screw above the cap, and a lock for locking said screw carrying member and the cap together to prevent relative displacement of the cap and said member.

2. In combination with a liquid containing tank having an opening, a filler cap for said opening, a bail pivoted to the body of the tank and adapted to swing over said cap and having means to clamp said cap in closed position, parts carried by said bail and the cap adapted for connection to prevent relative displacement and a lock for joining said parts.

3. In combination with a liquid containing tank, having an opening, a filler cap hinged to the body of the tank, a bail mounted on said body and adapted to swing above the surface of the cap, a clamping screw carried by said bail and adapted to be forced against said cap to hold the latter closed, an arm extending from said bail, an arm extending from the cap and adapted to be connected to said bail arm, and a lock for connecting said arms.

4. In combination with a tank having an opening, a cap hinged to said tank and adapted to close said opening, a bail pivoted to said tank and having adjustable means for engaging said cap and means engageable with said bail and cap for locking said members against relative displacement.

5. In combination with a tank having an opening, a cap hinged to said tank and adapted to close said opening, and a bail pivoted to said tank and having an adjustable means for engaging said cap, said bail and cap having overlapping portions adapted to receive a locking member.

6. In combination with a tank having an opening, a hinged cap adapted to close said opening, an upwardly extending lug on said cap, and a bail pivoted to said tank and having means for engaging and retaining said cap in position to close said opening, said bail having a portion adapted to engage the lug on said cap when the cap is in position to close the tank opening.

7. In combination with a tank having an opening, a hinged cap adapted to close said opening, an upwardly extending lug on said cap, and a bail pivoted to said tank and having cap retaining means, said bail having portions adapted to embrace the lug on said cap, said lug and the embracing portions of said bail being apertured to receive the locking member.

In testimony whereof I affix my signature.

HORACE W. POTTER.